United States Patent
Kim et al.

(10) Patent No.: US 12,250,676 B2
(45) Date of Patent: Mar. 11, 2025

(54) METHOD AND DEVICE FOR TRANSMITTING UPLINK CHANNEL FOR MULTIPLE TRANSMISSION RECEPTION POINTS IN WIRELESS COMMUNICATION SYSTEM

(71) Applicant: LG ELECTRONICS INC., Seoul (KR)

(72) Inventors: Hyungtae Kim, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 410 days.

(21) Appl. No.: 17/797,835

(22) PCT Filed: Jan. 19, 2021

(86) PCT No.: PCT/KR2021/000761
§ 371 (c)(1),
(2) Date: Aug. 5, 2022

(87) PCT Pub. No.: WO2021/157910
PCT Pub. Date: Aug. 12, 2021

(65) Prior Publication Data
US 2023/0042391 A1  Feb. 9, 2023

(30) Foreign Application Priority Data
Feb. 7, 2020 (KR) .................. 10-2020-0015250

(51) Int. Cl.
*H04W 72/1268* (2023.01)
*H04L 5/00* (2006.01)
*H04W 72/23* (2023.01)

(52) U.S. Cl.
CPC ....... *H04W 72/1268* (2013.01); *H04L 5/0051* (2013.01); *H04W 72/23* (2023.01)

(58) Field of Classification Search
CPC .. H04W 72/23; H04W 72/1268; H04L 5/0051
See application file for complete search history.

(56) References Cited

U.S. PATENT DOCUMENTS

2018/0324770 A1* 11/2018 Nogami ................. H04L 5/005
2019/0222399 A1   7/2019 Huang et al.
(Continued)

FOREIGN PATENT DOCUMENTS

CN        110036575 A  *  7/2019  ........... H04B 7/0404
WO   WO-2014003313 A1  *  1/2014  ............. H04B 7/208
(Continued)

OTHER PUBLICATIONS

"Discussion on multi-beam enhancement", NTT Docomo, Inc., 3GPP TSG RAN WG1 #97, Reno, USA, May 13-17, 2019, R1-1906225.
(Continued)

*Primary Examiner* — Shean Tokuta
(74) *Attorney, Agent, or Firm* — BRYAN CAVE LEIGHTON PAISNER LLP

(57) ABSTRACT

Disclosed are a method and device for transmitting an uplink channel for multiple transmission reception points (TRPs) in a wireless communication system. A method for transmitting an uplink channel, according to one embodiment of the present disclosure, may comprise the steps of: mapping the uplink channel to N (N is an integer greater than or equal to 2) resource regions within one slot; and transmitting the mapped uplink channel to a network. The N resource regions include a first resource region and a second resource region, the uplink channel mapped to the first resource region is transmitted on the basis of a first transmission beam, the uplink channel mapped to the second resource region is transmitted on the basis of a second transmission beam, and
(Continued)

at least a start symbol in each of the first resource region and the second resource region may include a reference signal.

18 Claims, 14 Drawing Sheets

(56) References Cited

U.S. PATENT DOCUMENTS

| | | | |
|---|---|---|---|
| 2020/0037347 A1 | 1/2020 | Yang et al. | |
| 2020/0328849 A1* | 10/2020 | Noh | H04L 1/1812 |
| 2020/0351916 A1* | 11/2020 | Khoshnevisan | H04L 5/0035 |
| 2021/0367727 A1* | 11/2021 | Go | H04L 5/0048 |
| 2022/0353698 A1* | 11/2022 | Jang | H04L 5/0053 |
| 2023/0042391 A1* | 2/2023 | Kim | H04W 72/23 |

FOREIGN PATENT DOCUMENTS

| | | | | |
|---|---|---|---|---|
| WO | WO-2018204333 A1 * | 11/2018 | | H04L 27/26 |
| WO | WO-2021157910 A1 * | 8/2021 | | H04L 5/0051 |
| WO | WO-2021162264 A1 * | 8/2021 | | H04L 1/0003 |
| WO | WO-2021162334 A1 * | 8/2021 | | H04B 7/024 |
| WO | WO-2021162423 A1 * | 8/2021 | | H04L 1/08 |
| WO | WO-2021162483 A1 * | 8/2021 | | H04L 1/08 |
| WO | WO-2021162517 A1 * | 8/2021 | | H04B 17/318 |
| WO | WO-2021162522 A1 * | 8/2021 | | H04B 17/318 |
| WO | WO-2021162524 A1 * | 8/2021 | | H04B 7/024 |
| WO | WO-2021167348 A1 * | 8/2021 | | H04B 17/345 |
| WO | WO-2021182863 A1 * | 9/2021 | | H04B 17/318 |
| WO | WO-2024011579 A1 * | 1/2024 | | |

OTHER PUBLICATIONS

"On PUSCH enhancements for NR URLLC", Panasonic, 3GPP TSG RAN WG1 #99, Reno, USA, Nov. 18-22, 2019, R1-1912749.
"PUSCH enhancement for eURLLC", Samsung, 3GPP TSG RAN WG1 #99, Reno, USA, Nov. 18-22, 2019, R1-1912474.
"PUSCH enhancements for NR URLLC", LG Electronics, 3GPP TSG RAN WG1 #99, Reno, USA, Nov. 18-22, 2019, R1-1912398.

* cited by examiner

METHOD AND DEVICE FOR TRANSMITTING UPLINK CHANNEL FOR MULTIPLE TRANSMISSION RECEPTION POINTS IN WIRELESS COMMUNICATION SYSTEM

CROSS-REFERENCE TO RELATED APPLICATIONS

This application is the National Stage filing under 35 U.S.C. 371 of International Application No. PCT/KR2021/000761, filed on Jan. 19, 2021, which claims the benefit of Korean Application No. 10-2020-0015250, filed on Feb. 7, 2020, the contents of which are all hereby incorporated by reference herein in their entirety.

TECHNICAL FIELD

The present disclosure relates to a wireless communication system, and in more detail, relates to a method and a device of transmitting an uplink channel for multiple transmission reception points in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

When a terminal transmits an uplink channel to multiple transmission reception points (TRP), there is a problem that there are no or insufficient reference signals necessary for channel estimation when one uplink channel is partitively transmitted.

A technical object of the present disclosure is to provide a method and a device of effectively transmitting one uplink channel for multiple TRPs (MTRPs).

An additional technical object of the present disclosure is to provide a method and a device of effectively applying a transmission beam in transmitting one uplink channel for MTRPs.

An additional technical object of the present disclosure is to provide a method and a device of effectively transmitting a reference signal in transmitting one uplink channel for MTRPs.

The technical objects to be achieved by the present disclosure are not limited to the above-described technical objects, and other technical objects which are not described herein will be clearly understood by those skilled in the pertinent art from the following description.

Technical Solution

A method of transmitting an uplink channel by a terminal in a wireless communication system according to an aspect of the present disclosure may include mapping the uplink channel to N (N is an integer equal to or greater than 2) resource regions in one slot and transmitting the mapped uplink channel to a network. The N resource regions may include a first resource region and a second resource region, the uplink channel mapped to the first resource region may be transmitted based on a first transmission beam, the uplink channel mapped to the second resource region may be transmitted based on a second transmission beam and at least a start symbol may include a reference signal in each of the first resource region and the second resource region.

A terminal transmitting an uplink channel in a wireless communication system according to an additional aspect of the present disclosure may include one or more transceivers and one or more processors connected with the one or more transceivers. The one or more processors may be configured to map the uplink channel to N (N is an integer equal to or greater than 2) resource regions in one slot and transmit the mapped uplink channel to a network through the transceiver. The N resource regions may include a first resource region and a second resource region, the uplink channel mapped to the first resource region may be transmitted based on a first transmission beam, the uplink channel mapped to the second resource region may be transmitted based on a second transmission beam and at least a start symbol may include a reference signal in each of the first resource region and the second resource region.

[Technical Effects]

According to an embodiment of the present disclosure, a method and a device of effectively transmitting one uplink channel for multiple TRPs (MTRPs) may be provided.

According to an embodiment of the present disclosure, a method and a device of effectively applying a transmission beam in transmitting one uplink channel for MTRPs may be provided.

According to an embodiment of the present disclosure, a method and a device of effectively transmitting a reference signal in transmitting one uplink channel for MTRPs may be provided.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
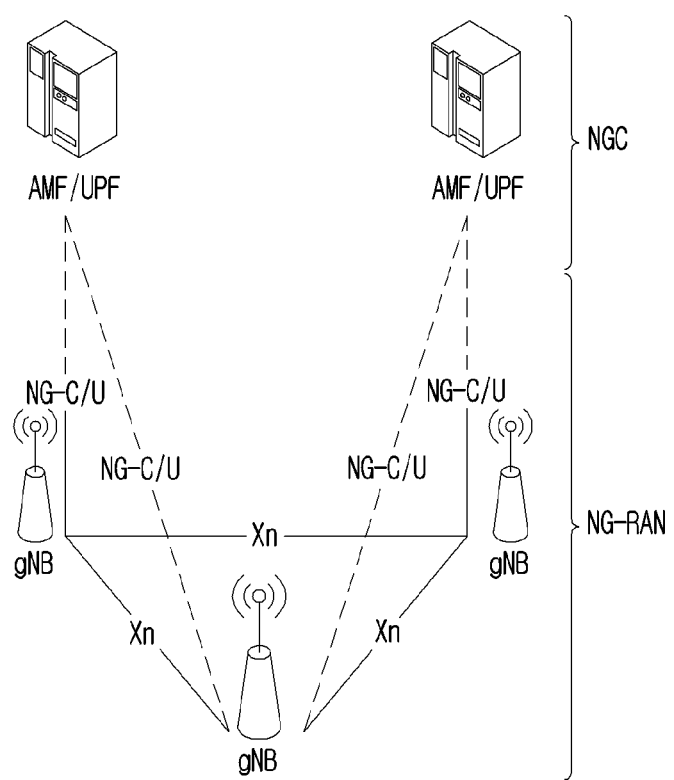
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
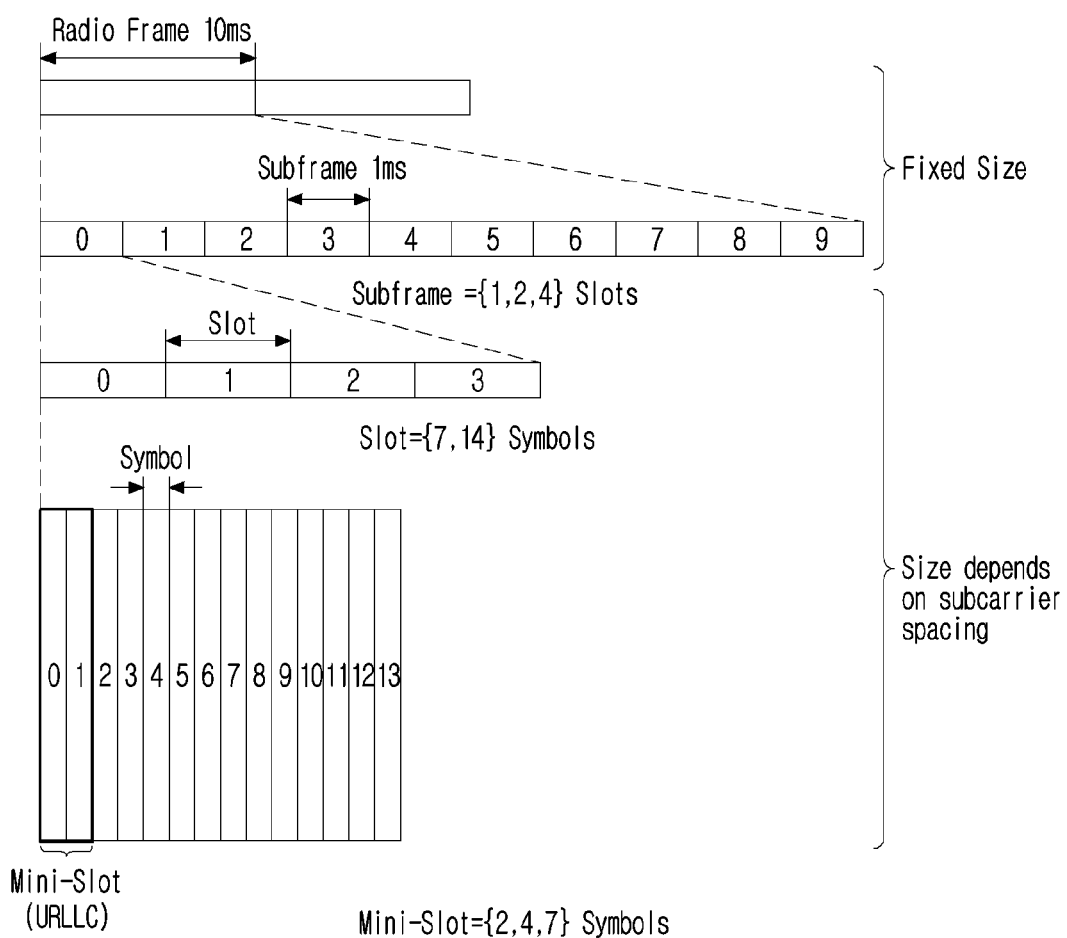
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described.

A plurality of OFDM numerologies supported in a NR system may be defined as in the following Table 1.

TABLE 1

| μ | Δf = $2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c = 1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f = 1/(\Delta f_{max} N_f/100) \cdot T_c = 10$ ms. Here, a radio frame is configured with 10 subframes having a duration of $T_{sf} = (\Delta f_{max} N_f/1000) \cdot T_c = 1$ ms, respectively. In this case, there may be one set of frames for an uplink and one set of frames for a downlink. In addition, transmission in an uplink frame No. i from a terminal should start earlier by $T_{TA} = (N_{TA} + N_{TA,offset}) T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu} - 1\}$ in a subframe and are numbered in an increasing order of $n_{s,f}^\mu \in \{0, \ldots, N_{slot}^{frame,\mu} - 1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$) the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
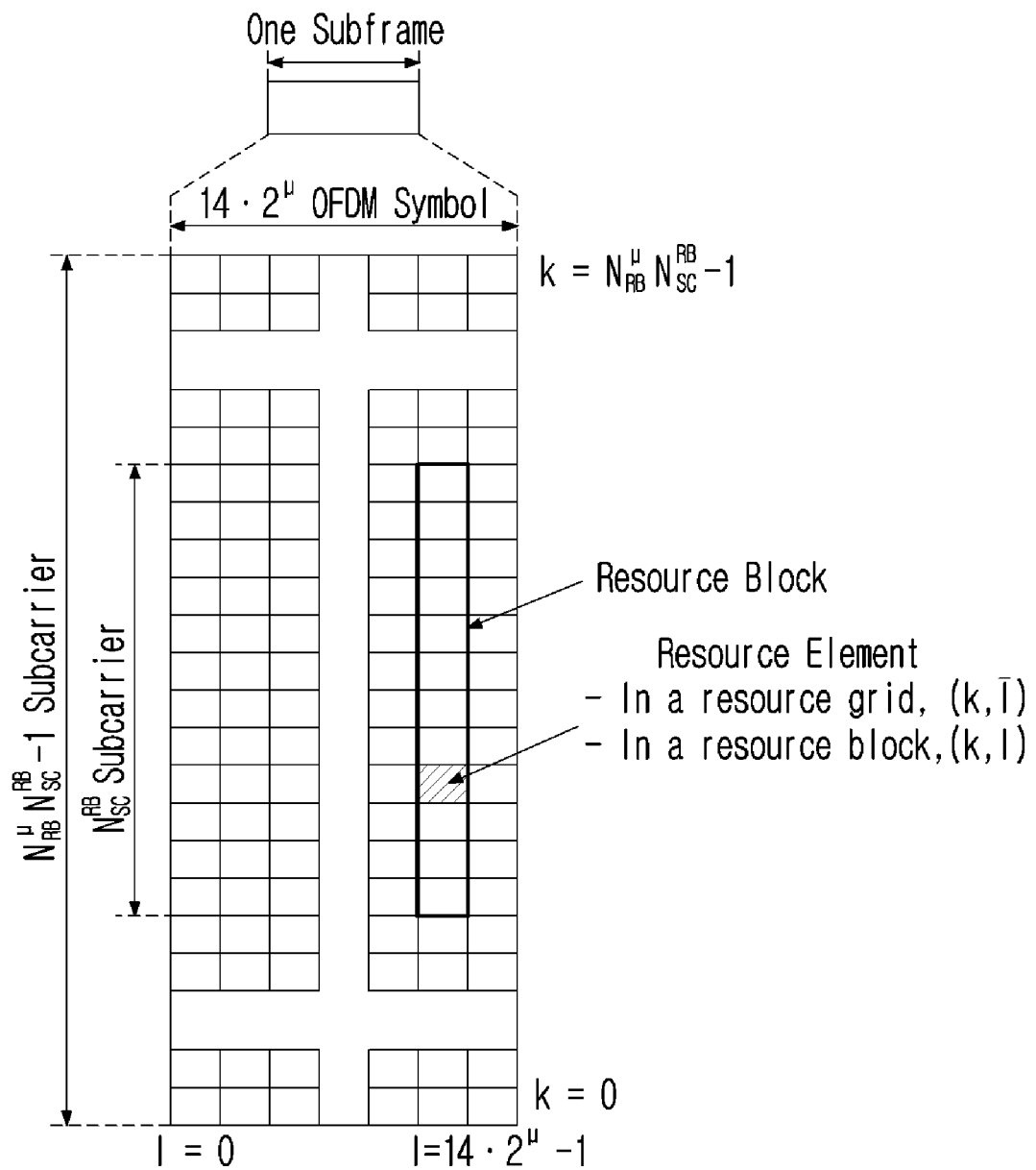
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0, \ldots, N_{RB}^\mu N_{sc}^{RB} - 1$ is an index in a frequency domain and $l'=0, \ldots, 2^\mu N_{symb}^{(\mu)} - 1$ refers to a position of a symbol in a subframe. When referring to a resource element in a slot, an index pair (k,l) is used. Here, $l=0, \ldots, N_{symb}^\mu - 1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l}^{(p)}$ or $a_{k,l}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu}=n_{PRB}^{\mu}+N_{BWP,i}^{start,\mu} \quad \text{[Equation 2]}$$

$N_{BWP,i}^{start,\mu}$ is a common resource block that a BWP starts relatively to common resource block 0.

Figure 4:
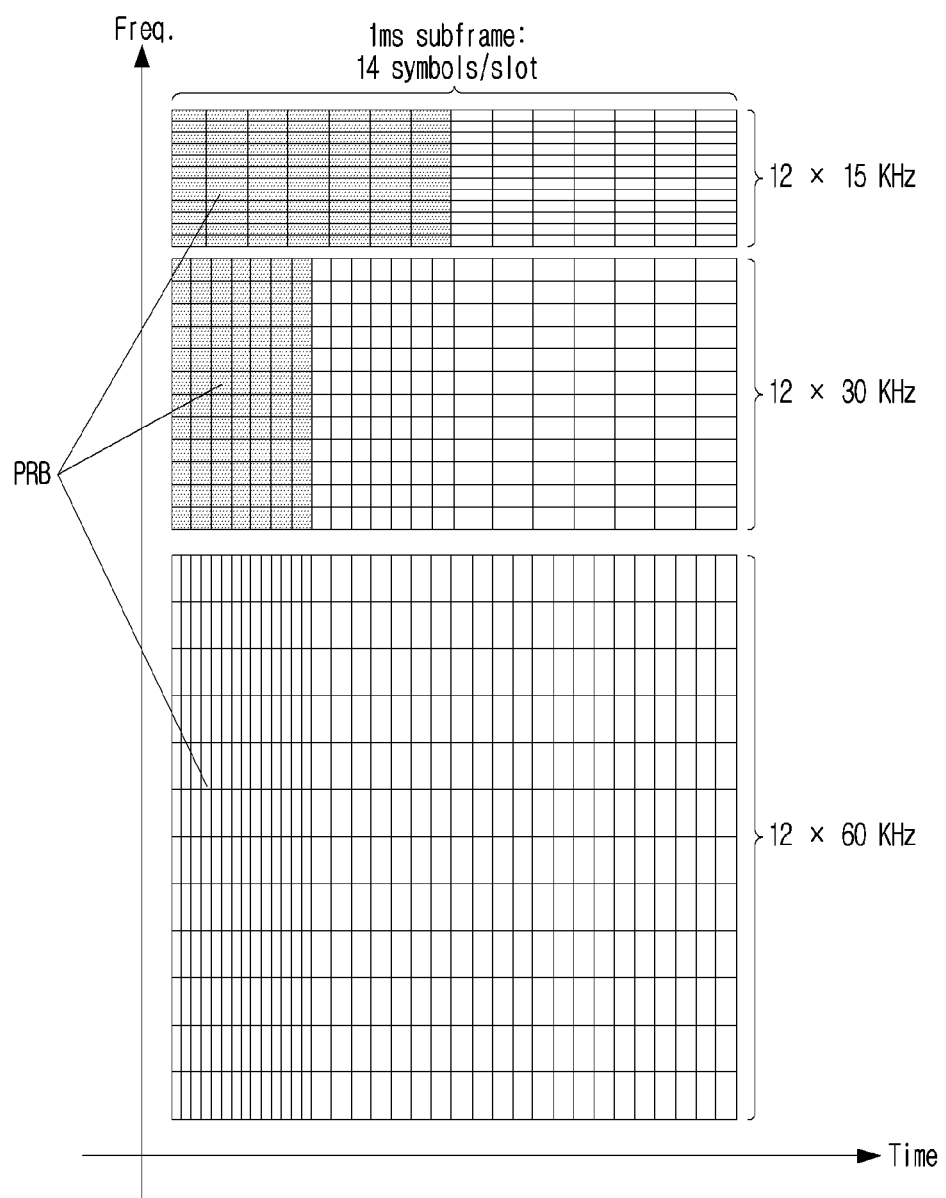
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
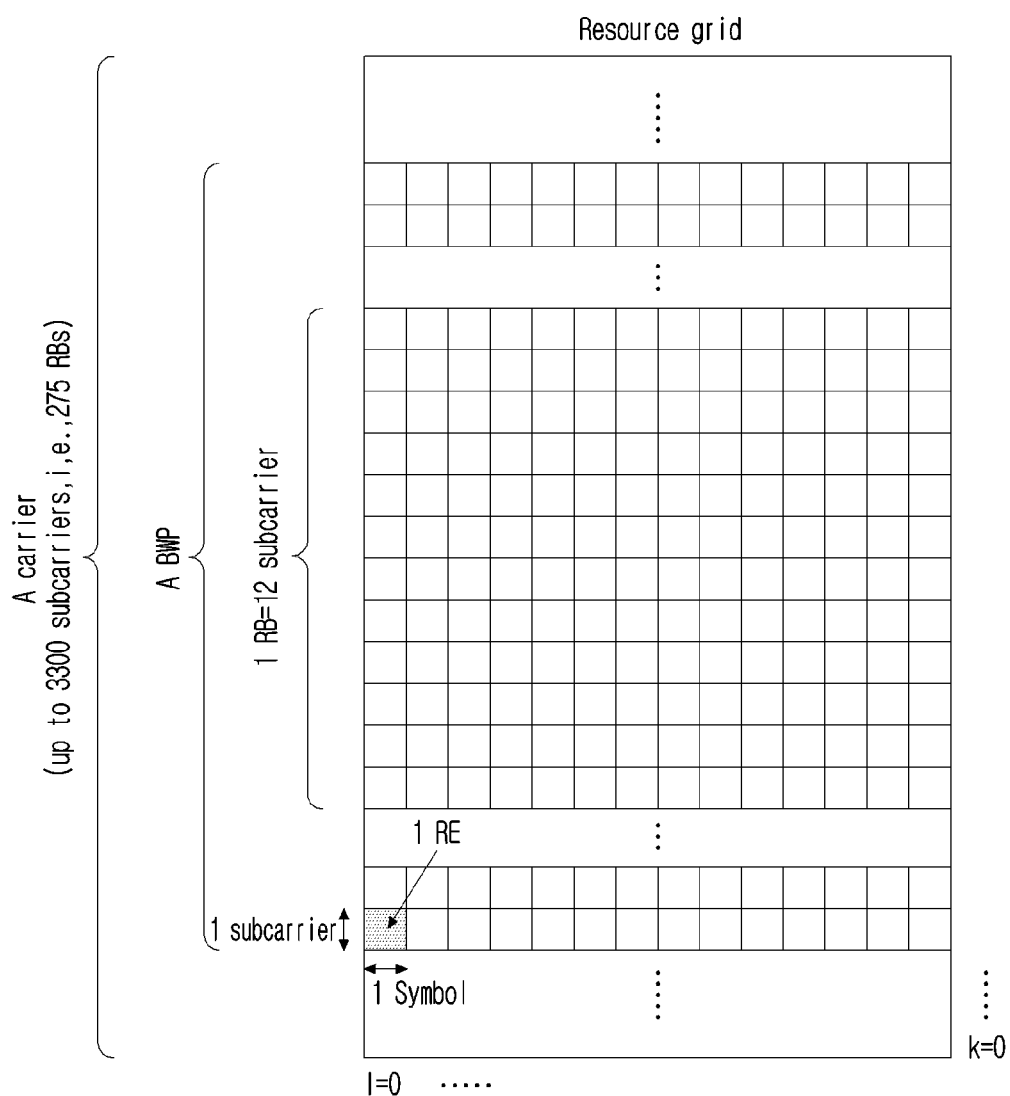
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing.

Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
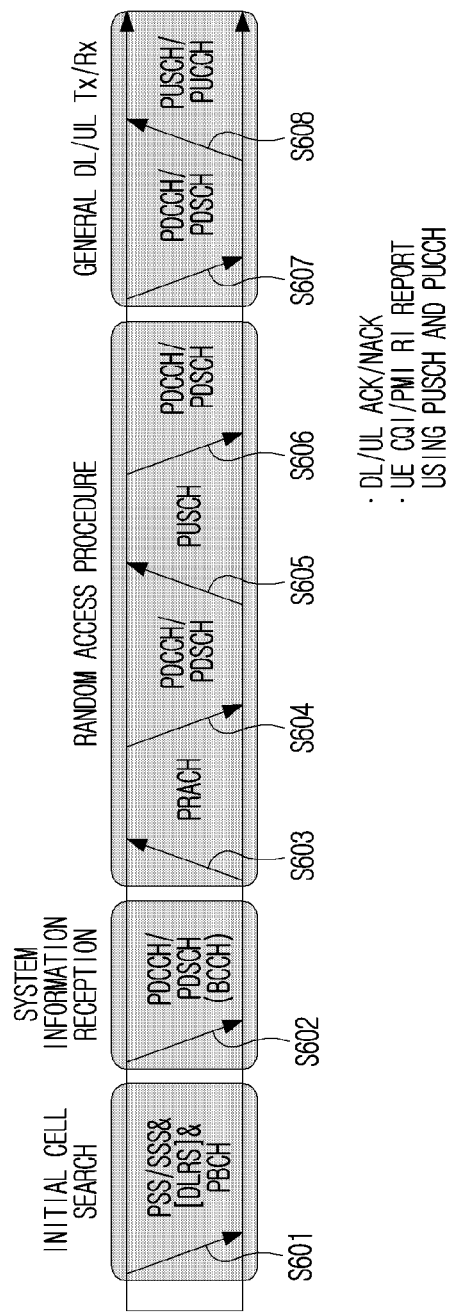
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be predefined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be predefined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, multiple DCI based non-coherent joint transmission (NCJT)/single DCI based NCJT will be described.

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, 'a single DCI based MTRP scheme' is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI (Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORESET group. (Here, a CORESET group may be identified by an index defined in a CORESET configuration of each CORESET. For example, when index=0 is configured for CORESETs 1 and 2 and index=1 is configured for CORESETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group).

Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 7:
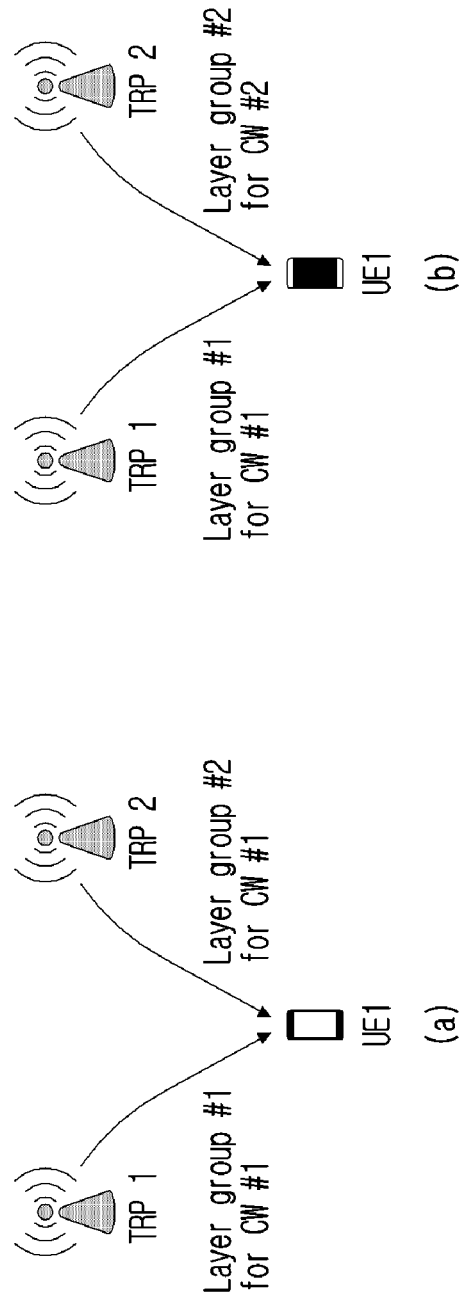
FIG. 7 illustrates a method of transmitting multiple TRPs in a wireless communication system to which the present disclosure may be applied.

FIG. 7 illustrates a method of multiple TRPs transmission in a wireless communication system to which the present disclosure may be applied.

In reference to FIG. 7(*a*), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(*b*), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(*b*), it may have a disadvantage that a code rate corresponding to a TB is higher compared to FIG. 7(*a*). However, it has an advantage that it may adjust a code rate by indicating a different RV (redundancy version) value or may adjust a modulation order of each CW for encoded bits generated from the same TB according to a channel environment.

According to methods illustrated in FIG. 7(*a*) and FIG. 7(*b*) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following method is discussed.

1) Method 1 (SDM): Time and frequency resource allocation is overlapped and n (n<=Ns) TCI states in a single slot 1-a) Method 1a The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule.

1-b) Method 1b

The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

At one transmission time (occasion), the same TB having one DMRS port associated with multiple TCI state indexes is transmitted in one layer or the same TB having multiple DMRS ports one-to-one associated with multiple TCI state indexes is transmitted in one layer.

In case of the method 1a and 1c, the same MCS is applied to all layers or all layer sets.

2) Method 2 (FDM): frequency resource allocation is not overlapped and n (n<=Nf) TCI States in a single slot Each non-overlapping frequency resource allocation is associated with one TCI state.

The same single/multiple DMRS port(s) are associated with all non-overlapping frequency resource allocation.

2-a) Method 2a

A single codeword having one RV is used for all resource allocation. With regard to UE, common RB matching (mapping of a codeword to a layer) is applied to all resource allocation.

2-b) Method 2b

A single codeword having one RV is used for each non-overlapping frequency resource allocation. A RV corresponding to each non-overlapping frequency resource allocation may be the same or different.

For the method 2a, the same MCS is applied to all non-overlapping frequency resource allocation.

3) Method 3 (TDM): Time resource allocation is not overlapped and n (n<=Nt1) TCI states in a single slot Each transmission time (occasion) of a TB has time granularity of a mini-slot and has one TCI and one RV.

A common MCS is used with a single or multiple DMRS port(s) at every transmission time (occasion) in a slot.

A RV/TCI may be the same or different at a different transmission time (occasion).

4) Method 4 (TDM): n (n<=Nt2) TCI states in K (n<=K) different slots

Each transmission time (occasion) of a TB has one TCI and one RV.

Every transmission time (occasion) across K slots uses a common MCS with a single or multiple DMRS port(s).

A RV/TCI may be the same or different at a different transmission time (occasion).

Hereinafter, MTRP URLLC is described.

In the present disclosure, DL MTRP URLLC means that multiple TRPs transmit the same data (e.g., the same TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is configured from a base station for which QCL RS/type (i.e., a DL TCI state) should be used in a layer/time/frequency resource receiving the same data/DCI. For example, when the same data/DCI is received in resource 1 and resource 2, a DL TCI state used in resource 1 and a DL TCI state used in resource 2 may be configured. UE may achieve high reliability because it receives the same data/DCI through resource 1 and resource 2. Such DL MTRP URLLC may be applied to a PDSCH/a PDCCH.

And, in the present disclosure, UL MTRP-URLLC means that multiple TRPs receive the same data/UCI (uplink control information) from any UE by using a different layer/time/frequency resource. For example, TRP 1 receives the same data/DCI from UE in resource 1 and TRP 2 receives the same data/DCI from UE in resource 2 to share received data/DCI through a backhaul link connected between TRPs. UE configured with a UL MTRP-URLLC transmission method transmits the same data/UCI by using a different layer/time/frequency resource. In this case, UE is configured from a base station for which Tx beam and which Tx power (i.e., a UL TCI state) should be used in a layer/time/frequency resource transmitting the same data/DCI. For example, when the same data/UCI is transmitted in resource 1 and resource 2, a UL TCI state used in resource 1 and a UL TCI state used in resource 2 may be configured. Such MTRP URLLC may be applied to a PUSCH/a PUCCH.

In addition, in the present disclosure, when a specific TCI state (or TCI) is used (or mapped) in receiving data/DCI/UCI for any frequency/time/space resource (layer), it means as follows. For a DL, it may mean that a channel is estimated from a DMRS by using a QCL type and a QCL RS indicated by a corresponding TCI state in that frequency/time/space resource (layer) and data/DCI is received/demodulated based on an estimated channel. In addition, for a UL, it may mean that a DMRS and data/UCI are transmitted/modulated by using a Tx beam and power indicated by a corresponding TCI state in that frequency/time/space resource.

Here, an UL TCI state has Tx beam and/or Tx power information of UE and may configure spatial relation information, etc. to UE through other parameter, instead of a TCI state. An UL TCI state may be directly indicated by UL grant DCI or may mean spatial relation information of a SRS resource indicated by a SRI (sounding resource indicator) field of UL grant DCI. Alternatively, it may mean an open loop (OL) Tx power control parameter connected to a value indicated by a SRI field of UL grant DCI (e.g., j: an index for open loop parameter Po and alpha (up to 32 parameter value sets per cell), q_d: an index of a DL RS resource for PL (pathloss) measurement (up to 4 measurements per cell), l: a closed loop power control process index (up to 2 processes per cell)).

Hereinafter, MTRP eMBB is described.

In the present disclosure, MTRP-eMBB means that multiple TRPs transmit different data (e.g., a different TB) by using a different layer/time/frequency. UE configured with a MTRP-eMBB transmission method receives an indication on multiple TCI states through DCI and assumes that data received by using a QCL RS of each TCI state is different data.

On the other hand, UE may figure out whether of MTRP URLLC transmission/reception or MTRP eMBB transmission/reception by separately dividing a RNTI for MTRP-URLLC and a RNTI for MTRP-eMBB and using them. In other words, when CRC masking of DCI is performed by using a RNTI for URLLC, UE considers it as URLLC transmission and when CRC masking of DCI is performed by using a RNTI for eMBB, UE considers it as eMBB transmission. Alternatively, a base station may configure MTRP URLLC transmission/reception or TRP eMBB transmission/reception to UE through other new signaling.

In a description of the present disclosure, it is described by assuming cooperative transmission/reception between 2 TRPs for convenience of a description, but a method proposed in the present disclosure may be also extended and applied in 3 or more multiple TRP environments and in addition, it may be also extended and applied in multiple panel environments (i.e., by matching a TRP to a panel). In addition, a different TRP may be recognized as a different TCI state to UE. Accordingly, when UE receives/transmits data/DCI/UCI by using TCI state 1, it means that data/DCI/UCI is received/transmitted from/to a TRP 1.

Hereinafter, methods proposed in the present disclosure may be utilized in a situation that MTRPs cooperatively transmit a PDCCH (repetitively transmit or partitively transmit the same PDCCH). In addition, methods proposed in the present disclosure may be also utilized in a situation that MTRPs cooperatively transmit a PDSCH or cooperatively receive a PUSCH/a PUCCH.

In addition, in the present disclosure, when a plurality of base stations (i.e., MTRPs) repetitively transmit the same PDCCH, it may mean the same DCI is transmitted through multiple PDCCH candidates and it may also mean that a plurality of base stations repetitively transmit the same DCI. Here, the same DCI may mean two DCI with the same DCI format/size/payload. Alternatively, although two DCI has a different payload, it may be considered the same DCI when a scheduling result is the same. For example, a TDRA (time domain resource allocation) field of DCI relatively determines a slot/symbol position of data and a slot/symbol position of A/N (ACK/NACK) based on a reception occasion of DCI, so if DCI received at n occasions and DCI received at n+1 occasions inform UE of the same scheduling result, a TDRA field of two DCI is different and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of the other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI is scheduling for the same data, so in this case, it may be considered the same DCI.

In addition, in the present disclosure, when a plurality of base stations (i.e., MTRPs) partitively transmit the same PDCCH, it means that one DCI is transmitted through one PDCCH candidate, but TRP 1 transmits some resources that such a PDCCH candidate is defined and TRP 2 transmits the remaining resources.

In addition, in the present disclosure, when UE repetitively transmits the same PUSCH so that a plurality of base stations (i.e., MTRPs) can receive it, it may mean that UE transmitted the same data through multiple PUSCHs. In this case, each PUSCH may be optimized and transmitted to an UL channel of a different TRP. For example, when UE repetitively transmits the same data through PUSCH 1 and 2, PUSCH 1 is transmitted by using UL TCI state 1 for TRP 1 and in this case, link adaptation such as a precoder/MCS, etc. may be also scheduled/applied to a value optimized for a channel of TRP 1. PUSCH 2 is transmitted by using UL TCI state 2 for TRP 2 and link adaptation such as a precoder/MCS, etc. may be also scheduled/applied to a value optimized for a channel of TRP 2. In this case, PUSCH 1 and 2 which are repetitively transmitted may be transmitted at a different time to be TDM, FDM or SDM.

In addition, in the present disclosure, when UE partitively transmits the same PUSCH so that a plurality of base stations (i.e., MTRPs) can receive it, it may mean that UE transmits one data through one PUSCH, but it divides resources allocated to that PUSCH, optimizes them for an UL channel of a different TRP and transmits them. For example, when UE transmits the same data through 10 symbol PUSCHs, data is transmitted by using UL TCI state 1 for TRP 1 in 5 previous symbols and in this case, link adaptation such as a precoder/MCS, etc. may be also scheduled/applied to a value optimized for a channel of TRP 1. The remaining data is transmitted by using UL TCI state 2 for TRP 2 in the remaining 5 symbols and in this case, link adaptation such as a precoder/MCS, etc. may be also scheduled/applied to a value optimized for a channel of TRP 2. In the example, transmission for TRP 1 and transmission for TRP 2 are TDM-ed by dividing one PUSCH into time resources, but it may be transmitted by a FDM/SDM method.

In addition, similarly to the above-described PUSCH transmission, also for a PUCCH, UE may repetitively transmit the same PUCCH or may partitively transmit the same PUCCH so that a plurality of base stations (i.e., MTRPs) receive it.

Hereinafter, a proposal of the present disclosure may be extended and applied to a variety of channels such as a PUSCH/a PUCCH/a PDSCH/a PDCCH, etc.

Uplink Channel Partition Transmission

In a M-TRP environment that one terminal may communicate with a plurality of TRPs, a terminal may partitively transmit one (single) uplink channel to a plurality of TRPs.

Here, an uplink channel may be a PUCCH or a PUSCH, an uplink channel defined in a physical layer, unless otherwise mentioned or may include any physical uplink channel which is newly defined. In addition, one uplink channel may mean a unit generated through a variety of physical layer processing (e.g., code block partition, channel coding, rate matching, code block connection, scrambling, modulation, layer mapping, precoding, resource block mapping, etc.) for one uplink data unit (e.g., a TB). In addition, one uplink channel may mean a unit generated through a variety of physical layer processing for one uplink control information (UCI) unit. In addition, one uplink channel may mean a unit generated through a variety of physical layer processing including multiplexing in one uplink data unit and one UCI unit. Accordingly, partitioning one uplink channel may include partitioning one uplink data unit and/or one UCI unit and may also include partitioning a result of physical layer processing for one uplink data unit and/or one UCI unit. Accordingly, when one uplink channel is partitioned, different parts in one uplink data unit and/or one UCI unit may be included or all or part of overlapped parts may be included in each of partitioned parts.

In addition, a TRP may be included in a base station or a cell. One TRP may correspond to one base station or one cell and a plurality of TRPs may correspond to one base station or one cell. When a plurality of TRPs receive each of partitioned parts of one uplink channel from one terminal, one uplink channel may be obtained based on uplink channel parts received in a plurality of TRPs.

When a terminal transmits an uplink channel to a TRP, an uplink reference signal (e.g., an uplink DMRS) may be transmitted by being multiplexed with an uplink channel and an uplink channel may be demodulated by using an uplink reference signal in a TRP. An uplink reference signal may correspond to a transmission beam or a transmission beam direction. A term of beam may be replaced with a term of reference signal.

The existing uplink DMRS multiplexing method does not consider partition transmission of an uplink channel, so it may have a structure that a DMRS is multiplexed only for part of a radio resource to which one uplink channel is mapped. Accordingly, when a terminal partitively transmits one uplink channel to a plurality of TRPs, an uplink DMRS may not be properly distributed to partitioned parts of an uplink channel and a TRP which received a partitioned part of an uplink channel mapped to a resource with no or insufficient DMRSs may not rightly demodulate it.

To solve such a problem, in examples of the present disclosure, one uplink channel may make each TRP rightly demodulate or receive partitioned parts of an uplink channel by applying transmission beam hopping to a plurality of resource regions to which partitioned parts are mapped. Transmission beam information related to uplink channel transmission may be used to apply transmission beam hopping. Transmission beam information may include a TCI state and/or spatial relation information.

In addition, according to a resource domain which is a standard for partition of an uplink channel, time division multiplexing (TDM), frequency division multiplexing (FDM), spatial division multiplexing (SDM), or a multiplexing method by a combination of two or more of a time, a frequency or a space may be applied. In examples of the present disclosure, for clarity of a description, partitioning an uplink channel by a TDM method (i.e., mapping partitioned parts of one uplink channel to a different time resource) is mainly described, but a scope of the present disclosure is not limited thereto. In other words, when an uplink DMRS transmission resource may be divided into a time, a frequency and/or a space, an uplink channel may be also partitioned based on a time, a frequency and/or a space.

Hereinafter, specific examples for applying a different DMRS (or a different beam) corresponding to each TRP in each resource region to which partitioned parts of an uplink channel are mapped are described.

First, a configuration which may be commonly applied to embodiments of the present disclosure is described.

When a terminal partitively transmits a PUSCH so that MTRPs can receive it, a base station informs UE of UL TCI state information which will be used in PUSCH transmission through DCI. In addition, when a plurality of TCI states are indicated and the same PUSCH is scheduled to be transmitted only one time (e.g., when a granted PUSCH is not repetitively transmitted, or when a grant free (or configured grant) PUSCH is activated, but the same PUSCH is not repetitively transmitted), it is recognized that UE partitively transmits a corresponding PUSCH so that MTRPs can receive it.

In other words, when repeat-free transmission of one uplink channel is scheduled for a terminal and a plurality of transmission beam information (e.g., a TCI state and/or spatial relation information) is provided from a base station, a terminal may partitively transmit the one uplink channel.

Hereinafter, for convenience of a description, it is assumed that two TRPS (e.g., TRP 1 and TRP 2) operate. But, such an assumption does not limit a technical scope of the present disclosure, so various examples of the present disclosure may be also naturally applied to two or more MTRP operations.

When a PUSCH is partitively transmitted so that MTRPs can receive it, some OFDM symbols (e.g., 5 front symbols) configuring one PUSCH (e.g., a PUSCH transmitted in 10 OFDM symbols within one slot) may be referred to as PUSCH resource 1 and may be transmitted towards TRP 1 by using TCI state 1 in PUSCH resource 1 and other OFDM symbols (e.g., 5 back symbols) may be referred to as PUSCH resource 2 and may be transmitted towards TRP 2 by using TCI state 2 in PUSCH resource 2.

Here, TRP 1 should perform channel estimation through a PUSCH DMRS in resource 1 and TRP 2 should perform channel estimation through a PUSCH DMRS in resource 2, so an independent or distinct DMRS needs to be transmitted to PUSCH resource 1 and 2, respectively.

But, a currently defined DMRS was designed on the assumption that one TRP receives one PUSCH resource (i.e., both PUSCH resource 1 and resource 2).

For example, a DMRS may be transmitted only to PUSCH resource 1 and a DMRS may not exist in PUSCH resource 2. Alternatively, when only a front-loaded DMRS exists in a PUSCH, a DMRS does not exist in PUSCH resource 2. In this case, there is no DMRS in PUSCH resource 2, so it is hard for TRP 2 to rightly perform PUSCH decoding or demodulation in PUSCH resource 2.

Alternatively, TRP 1 and 2 may not achieve the same level of channel estimation performance because DMRS density of PUSCH resource 1 and 2 is unevenly distributed. For example, when there are 1 front-loaded DMRS symbol and 2 additional DMRS symbols in a PUSCH, there is 1 DMRS symbol in PUSCH resource 1 and there are 2 DMRS symbols in PUSCH resource 2.

The following Table 6 illustratively represents a position of a PUSCH DMRS in one slot for a case in which intra-slot frequency hopping is disabled and is a single-symbol DMRS. Table 7 illustratively represents a position of a PUSCH DMRS in one slot for a case in which frequency hopping is enabled and is a single-symbol DMRS.

TABLE 6

| | DM-RS positions $\bar{l}$ | | | | | | | |
|---|---|---|---|---|---|---|---|---|
| | PUSCH mapping type A dmrs-AdditionalPosition | | | | PUSCH mapping type B dmrs-AdditionalPosition | | | |
| $l_d$ in symbols | pos0 | pos1 | pos2 | pos3 | pos0 | pos1 | pos2 | pos3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, 4 | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

TABLE 7

| | DM-RS positions $\bar{l}$ | | | | | | | | | | | |
|---|---|---|---|---|---|---|---|---|---|---|---|---|
| | PUSCH mapping type A | | | | | | | | PUSCH mapping type B | | | |
| | $l_0 = 2$ dmrs-AdditionalPosition | | | | $l_0 = 3$ dmrs-AdditionalPosition | | | | $l_0 = 0$ dmrs-AdditionalPosition | | | |
| | pos0 | | pos1 | | pos0 | | pos1 | | pos0 | | pos1 | |
| $l_d$ in symbols | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop |
| ≤3 | — | — | — | — | — | — | — | — | 0 | 0 | 0 | 0 |
| 4 | 2 | 0 | 2 | 0 | 3 | 0 | 3 | 0 | 0 | 0 | 0 | 0 |
| 5, 6 | 2 | 0 | 2 | 0, 4 | 3 | 0 | 3 | 0, 4 | 0 | 0 | 0, 4 | 0, 4 |
| 7 | 2 | 0 | 2, 6 | 0, 4 | 3 | 0 | 3 | 0, 4 | 0 | 0 | 0, 4 | 0, 4 |

Table 6 and Table 7 represent examples of a predetermined DMRS position for each hop (e.g., a first hop and a second hop). A predetermined DMRS position may include the number of symbols that a DMRS is located in a corresponding hop and an index of a symbol including a DMRS, etc. In addition, a specific DMRS pattern among a variety of predetermined DMRS patterns may be applied to each DMRS position. A DMRS pattern may be defined as a resource to which one or more antenna ports of a DMRS are mapped (e.g., one or more of a time, frequency, code resource). In the present disclosure, a DMRS pattern is not limited to a specific pattern and includes various examples which determine a DMRS position in each resource region.

In Table 6 and Table 7, $l_d$ represents the number of OFDM symbols corresponding to a duration of a scheduled PUSCH resource and represents a duration per hop when intra-slot frequency hopping is applied. In Table 6 and Table 7, a DMRS position corresponds to an OFDM symbol index in a slot and $l_0$ may have a value of 0 or have a value given by a higher layer according to a PUSCH mapping type. Aside from an example of Table 6 and Table 7, a DMRS position may be also predetermined for a variety of combinations of a case in which a single-symbol or double-symbol DMRS, or intra-slot frequency hopping is enabled or disabled.

Figure 8:
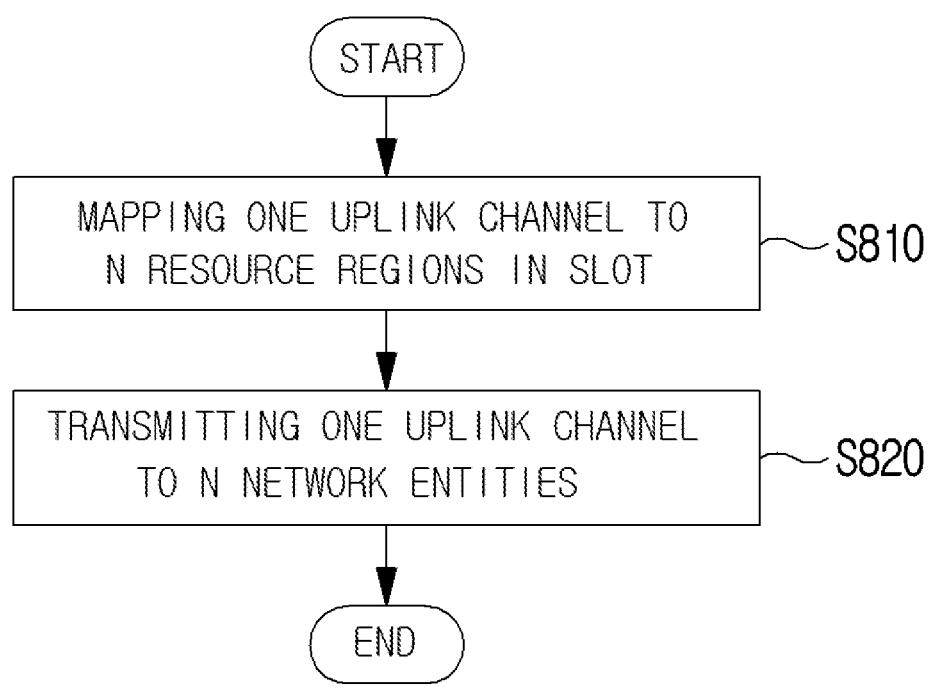
FIG. 8 is a flow chart for describing an example of an uplink channel partition transmission method according to the present disclosure.

FIG. 8 is a flow chart for describing an example of an uplink channel partition transmission method according to the present disclosure.

In S810, a terminal may map one uplink channel to N (N is an integer equal to or greater than 2) resource regions in one slot. Accordingly, one uplink channel may be partitioned into N parts mapped to each resource region.

In S820, a terminal may transmit the one uplink channel mapped to N resource regions to N network entities. Here, a network entity may correspond to a base station, a cell, a TRP, a panel or a CORESET.

For example, a n-th partitioned part of one uplink channel mapped to a n-th (n=1, 2, ..., N) resource region may be transmitted to a n-th network entity based on a n-th transmission beam.

Here, a corresponding relationship of two or more of a resource region, a partitioned part of an uplink channel, a transmission beam or a network entity may be determined by one or more of signaling between a base station and a terminal (explicit signaling and/or implicit signaling) or a predefined rule between a base station and a terminal.

In addition, N transmission beams may correspond to N transmission beam information (e.g., a TCI state or spatial relation information), respectively. In addition, N transmission beams may correspond to N DMRSs, respectively.

N network entities, based on channel information estimated by N transmission beam information (or N DMRSs) in N resource regions, may demodulate and combine N partitioned parts of one uplink channel to receive data transmitted by a terminal through the one uplink channel.

Embodiment 1

This embodiment includes a method of transmitting a DMRS in an uplink channel transmission resource corresponding to each TRP by applying intra-slot transmission beam hopping.

Intra-slot transmission beam hopping should be distinguished from frequency hopping in that while a different transmission beam (or DMRS) is applied per hop in a slot, a frequency position is not changed per hop.

Here, a hop may correspond to an example of a resource region. For example, a resource region that one uplink channel transmission in one slot is scheduled may be divided into N (N is an integer equal to or greater than 2) resource regions. For N=2, a first part of one uplink channel mapped to a first resource region may be transmitted to a first TRP and a second part of the one uplink channel mapped to a second resource region may be transmitted to a second TRP. Transmission in a first resource region may be based on first transmission beam information and transmission in a second resource region may be based on second transmission beam information. For example, a first DMRS based on first transmission beam information may be transmitted by being multiplexed with a first part of the one uplink channel in a first resource region and a second DMRS based on second transmission beam information may be transmitted by being multiplexed with a second part of the one uplink channel in a second resource region.

When intra-slot frequency hopping is enabled, by dividing one PUSCH transmission resource into resource 1 and resource 2, a scheduled RB may be determined according to FDRA (frequency domain resource allocation) in resource 1 and a scheduled RB in resource 2 may be determined according to a frequency hopping rule (by a position of a frequency different from a scheduled RB in resource 1) based on a scheduled RB in resource 1. As the existing frequency hopping receives all PUSCHs that one TRP is transmitted in a plurality of hops, frequency diversity gain may be provided.

Here, UE may transmit an independent DMRS to resource 1 and resource 2 to perform independent channel estimation for resource 1 and resource 2, respectively. The Table 7 represents a DMRS position in a 1st hop and a 2nd hop. For example, when $l_d$ is 4, $l_{-0}$ is 2, a mapping type is A (PUSCH mapping type A) and a DMRS-additional position is pos0 (dmrs-AdditionalPosition=pos0), one PUSCH is divided into 4 symbols in a 1st hop and 4 symbols in a 2nd hop, a DMRS is transmitted to a third OFDM symbol of a 1st hop PUSCH in a 1st hop and a DMRS is transmitted to a first OFDM symbol of a 2nd hop PUSCH in a 2nd hop.

In addition, in order to support transmission beam hopping in partitively transmitting one uplink channel for MTRPs in a plurality of resource regions, a base station may inform a terminal of parameter(s) which will be applied to each of a plurality of resource regions (or hops). For example, a base station may provide a terminal with information on one or more of a plurality of transmission beam information corresponding to a plurality of resource regions (e.g., a plurality of TCI states and/or a plurality of spatial relation information), a plurality of link adaption parameters, or a plurality of SRS ports/resources.

When a PUSCH is partitively transmitted so that MTRPs can receive it, UE may enable intra-slot frequency hopping or transmission beam hopping, a 1st hop performs transmission by using UL TCI state 1 and hop 2 performs transmission by using UL TCI state 2. A base station may indicate one UL TCI state for transmission to one TRP (e.g., frequency hopping) when scheduling one PUSCH to a terminal, but a base station may operate to indicate a plurality of UL TCI states for transmission to MTRPs (e.g., transmission beam hopping).

When intra-slot frequency hopping is enabled, one TRP receives a PUSCH partition part in one hop, so only terminal implementation complexity may increase without providing frequency diversity gain although a different frequency position is used per hop. Accordingly, when a PUSCH is partitioned and a partition part is transmitted to a different TRP per hop, the same RB may be scheduled in a plurality of hops instead of scheduling a different RB per hop. In other words, according to a transmission beam hopping method, hopping on a frequency axis is not applied and a plurality of hops may be used to determine a time resource position and a DMRS symbol position.

A base station may distinguish a link adaptation parameter (e.g., a PMI, a MCS, etc.) which will be applied to each of a plurality of hops and indicate it to a terminal. But, a non-codebook based precoding method designates a port of a precoded SRS resource through a SRI instead of a PMI, so a base station may distinguish a SRS port/resource which will be applied to each of a plurality of hops and indicate it to a terminal. In other words, for a transmission beam hopping operation for MTRPs, a base station or a TRP may indicate to UE one or more of transmission beam information which will be applied to each hop (e.g., a TCI state and/or spatial relation information), link adaptation parameter information which will be applied to each hop, SRS port/resource information which will be applied to each hop.

Figure 9:
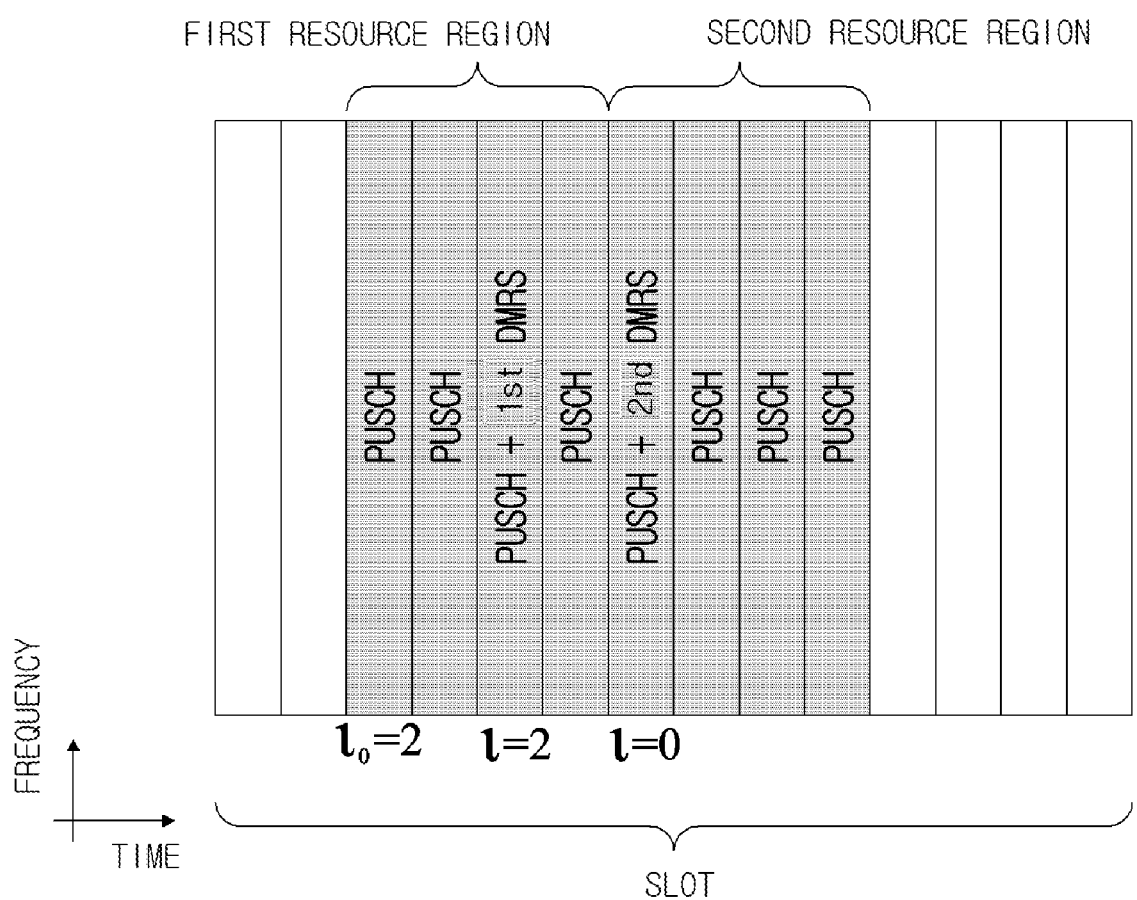
FIG. 9 to FIG. 12 are a diagram for representing examples of PUSCH partition transmission according to the present disclosure.

FIG. 9 is a diagram for representing an example of PUSCH partition transmission according to the present disclosure.

When one PUSCH is partitioned into a plurality of TRPs and transmitted in one slot, for example, one PUSCH may be mapped across 8 symbols from symbol index 2 in a slot.

All resources to which a PUSCH is mapped may be divided into two resource regions (or hops). A PUSCH mapped to a first resource region (i.e., corresponding to a first partitioned part of one PUSCH) may be transmitted to a first TRP based on a first transmission beam. In a first resource region, a first DMRS may be mapped (i.e., multiplexed with a PUSCH). A PUSCH mapped to a second resource region (i.e., corresponding to a second partitioned part of one PUSCH) may be transmitted to a second TRP based on a second transmission beam. In a second resource region, a second DMRS may be mapped (i.e., multiplexed with a PUSCH).

For example, in reference to Table 7, when 8 symbol PUSCHs are transmitted to $l_0$=2, dmrs-AdditionalPosition=pos0 through mapping type A, a DMRS position may be configured by assuming that 4 front symbols are hop 1 and 4 back symbols are hop 2. In other words, $l_d$ becomes 4 and a DMRS position is determined as 2 and 0 in hop 1 and 2, respectively. Here, Table 7 is an example on frequency hopping, but in embodiment 1, a DMRS position in each resource region (or hop) may be determined by Table 7 and unlike an assumption applied to Table 7, a frequency position of each of resource regions may be the same.

In an example of FIG. 9, the number of PUSCH mapping symbols, a position and a size of a PUSCH resource region, a position of a DMRS mapping symbol, etc. are illustrative and a variety of modifications may be included in a scope of the present disclosure.

Embodiment 2

This embodiment includes a method of shifting each PUSCH resource region and/or DMRS position while applying PUSCH partition transmission as in embodiment 1. Shifting a position of a PUSCH resource region and/or a DMRS position consequentially includes mapping a DMRS to a start (or first) symbol position of each PUSCH resource region.

For example, a DMRS position in each of a plurality of resource regions may be shifted to a first symbol position in time within one slot. Alternatively, a DMRS configuration of a first resource region may be equally applied to a DMRS of a second resource region. Alternatively, by flexibly configuring a position of a plurality of resource regions, a resource region position may be shifted so that a DMRS position will remain unchanged in a slot, but a start position of each resource region will be the same as a position of a DMRS.

For example, the following examples assume that 5 front symbols of a PUSCH composed of 10 symbols are configured as resource 1 and the remaining 5 symbols are configured as resource 2. The following examples describe a method of configuring a resource region position and/or a DMRS position by assuming specific resource allocation for convenience of a description, but a scope of the present disclosure may be also applied to various PUSCH resource allocation methods other than specific resource allocation.

Embodiment 2-1

When an additional DMRS is transmitted, a DMRS may be transmitted both in PUSCH resource 1 and 2. But, while a DMRS position in resource 1 is positioned in a front OFDM symbol, a DMRS position in resource 2 may be positioned in a back OFDM symbol. When a DMRS is used for uplink channel demodulation in a TRP, channel estimation performance may be improved when a DMRS is mapped to a first resource to which an uplink channel is mapped. Accordingly, in order to optimize a DMRS position in each resource region, a position of an additional DMRS may be shifted to a first symbol of resource 2.

Figure 10:
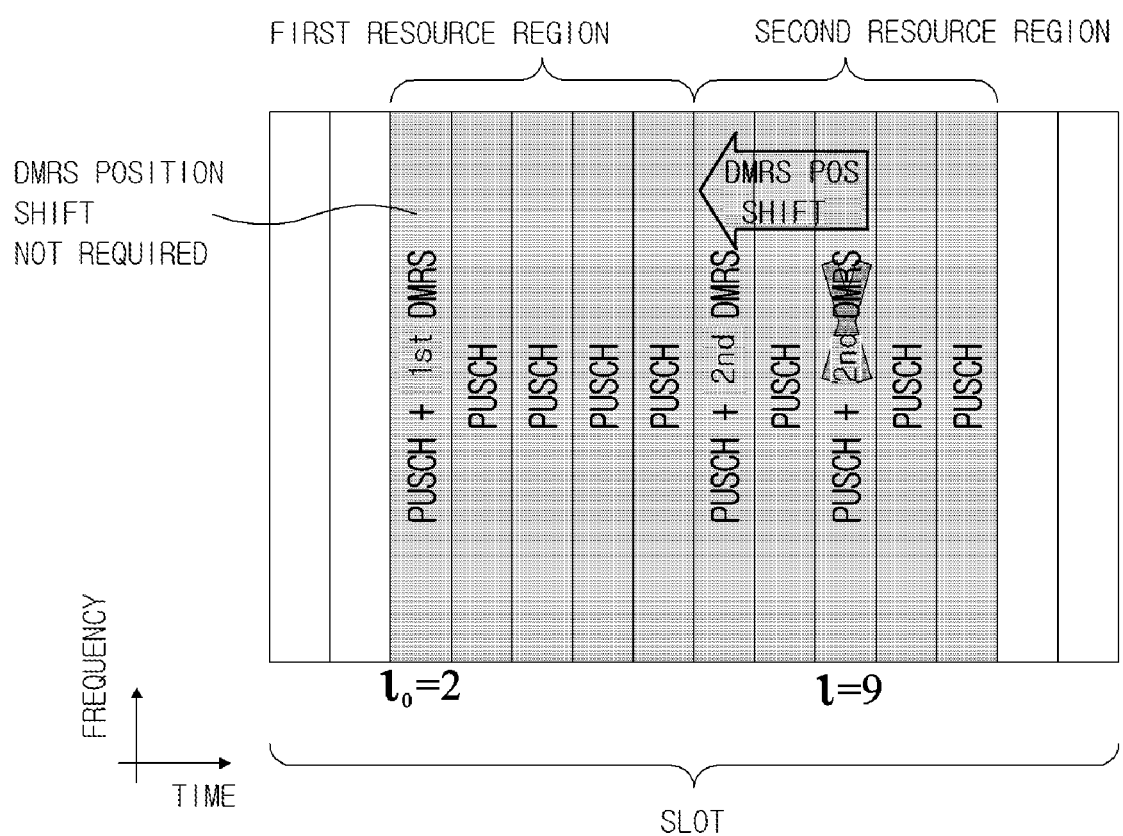

FIG. 10 is a diagram for representing an additional example of PUSCH partition transmission according to the present disclosure.

When one PUSCH is partitioned into a plurality of TRPs and transmitted in one slot, for example, one PUSCH may be mapped across 10 symbols from symbol index 2 in a slot. All resources to which a PUSCH is mapped may be divided into two resource regions (or hops). A PUSCH mapped to a first resource region corresponding to 5 symbols (i.e., corresponding to a first partitioned part of one PUSCH) may be transmitted to a first TRP based on a first transmission beam. A first DMRS may be mapped (i.e., multiplexed with a PUSCH) to a first symbol in a first resource region. A PUSCH mapped to a second resource region corresponding to other 5 symbols (i.e., corresponding to a second partitioned part of one PUSCH) may be transmitted to a second TRP based on a second transmission beam. According to the existing method of configuring a DMRS position, a DMRS is mapped to a third symbol in a second resource region (or symbol index 9 in a slot), but in this example, a DMRS position may be shifted so that a second DMRS will be mapped (i.e., multiplexed with a PUSCH) to a first symbol in a second resource region.

For example, in reference to Table 6, when a PUSCH composed of 10 symbols is configured as mapping type A, dmrs-AdditionalPosition=pos1, a DMRS symbol position may be determined as $l_0$— and 9. As DMRS position 1=9 corresponds to a third symbol of 5 symbols in resource 2, a channel estimation start occasion based on a DMRS in resource 2 is delayed. Accordingly, a DMRS position in resource 2 may be transmitted by being shifted from 9 to a first symbol position of resource 2. For example, if it is assumed that a start symbol position of resource 2 is s and a symbol position in resource 2 among DMRS symbol positions according to Table 6 is k, a DMRS is transmitted by shifting k to s. When there are a plurality of DMRS symbols in resource 2, all of a plurality of DMRS symbols may be transmitted by being shifted to a front symbol by k-s symbol.

Here, Table 6 is an example of a case in which frequency hopping is not applied, but in embodiment 2-1, when a DMRS position in a slot is determined by Table 6, but a DMRS position by Table 6 does not correspond to a first symbol in each resource region, a transmission beam hopping method of embodiment 1 may be applied with definition that a DMRS position is shifted to a first symbol in each resource region.

Embodiment 2-2

This embodiment includes equally applying a DMRS position in a first resource region to a second resource region.

Figure 11:
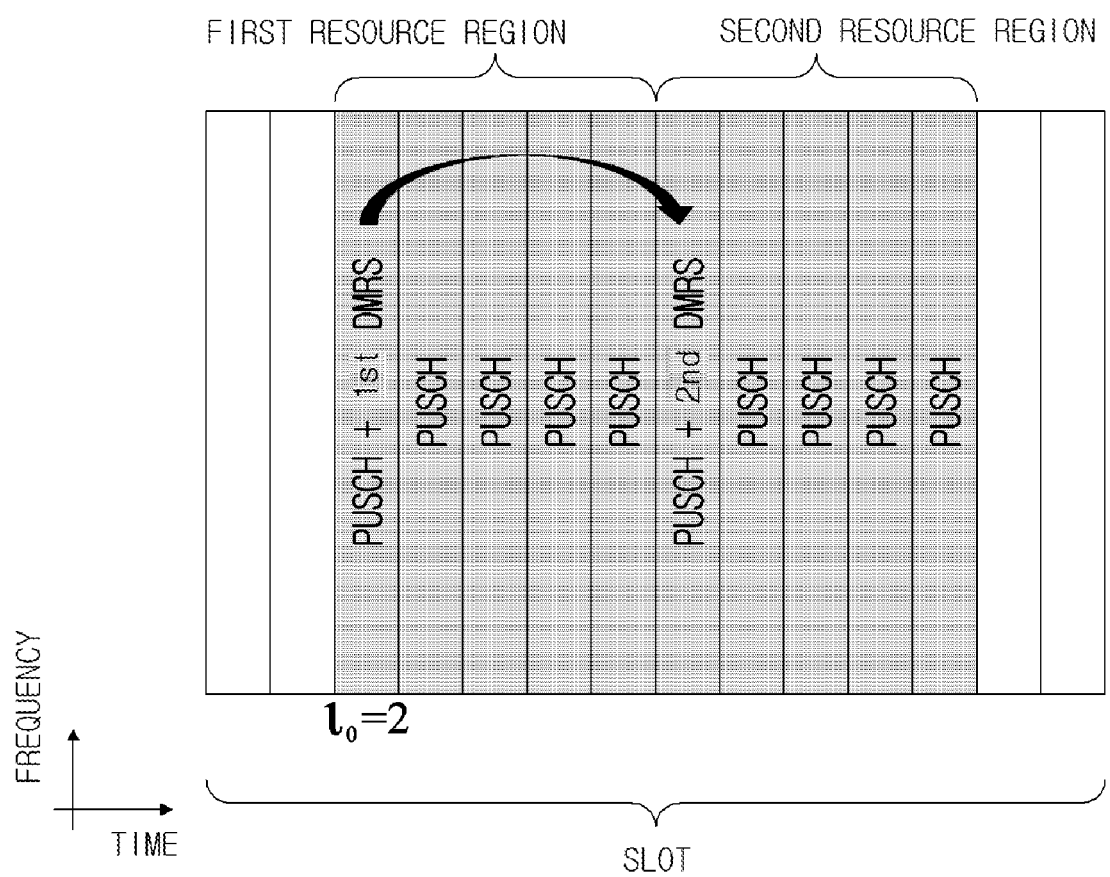

FIG. 11 is a diagram for representing an additional example of PUSCH partition transmission according to the present disclosure.

When one PUSCH is partitioned into a plurality of TRPs and transmitted in one slot, for example, one PUSCH may be mapped across 10 symbols from symbol index 2 in a slot. All resources to which a PUSCH is mapped may be divided into two resource regions (or hops). A PUSCH mapped to a first resource region corresponding to 5 symbols (i.e., corresponding to a first partitioned part of one PUSCH) may be transmitted to a first TRP based on a first transmission beam.

A first DMRS may be mapped (i.e., multiplexed with a PUSCH) to a first symbol in a first resource region. A PUSCH mapped to a second resource region corresponding to other 5 symbols (i.e., corresponding to a second partitioned part of one PUSCH) may be transmitted to a second TRP based on a second transmission beam. According to the existing method of configuring a DMRS position, a DMRS is mapped to a third symbol in a second resource region (or symbol index 9 in a slot), but in this example, a DMRS position in a second resource region may be configured to be the same as a DMRS position in a first resource region.

For example, after ignoring a symbol position belonging to resource 2 among DMRS symbol positions configured by Table 6, a DMRS symbol position transmitted to resource 1 may be equally used in resource 2. For example, when a PUSCH composed of 10 symbols is configured as mapping type A, dmrs-AdditionalPosition=pos1, a DMRS symbol position may be determined as $l_0$- and 9 according to Table 6. As DMRS position 1=9 is positioned in resource 2, it is ignored and a relative position of DMRS symbol $l_0$ in a resource region is understood in resource 1. In other words, when $l_0$ of 5 symbols configuring resource 1 is transmitted in a x-th symbol, a DMRS is transmitted in a z-th symbol of symbols configuring resource 2. Also when a plurality of DMRS symbols are configured in resource 1, based on a relative position in a resource region, a relative position in a resource region of a plurality of DMRS symbols may be determined in resource 2.

Here, Table 6 is an example of a case in which frequency hopping is not applied, but in embodiment 2-2, when a DMRS position in a slot is determined by Table 6, but a DMRS position by Table 6 does not correspond to a first symbol in each resource region, a corresponding DMRS position may be ignored. In addition, a transmission beam hopping method may be applied by configuring a DMRS position in other resource region to be the same as a DMRS position in a corresponding resource region where a DMRS is positioned in a first symbol in a resource region.

Embodiment 2-3

This embodiment includes shifting a position of a resource region, not a position of a DMRS.

Figure 12:
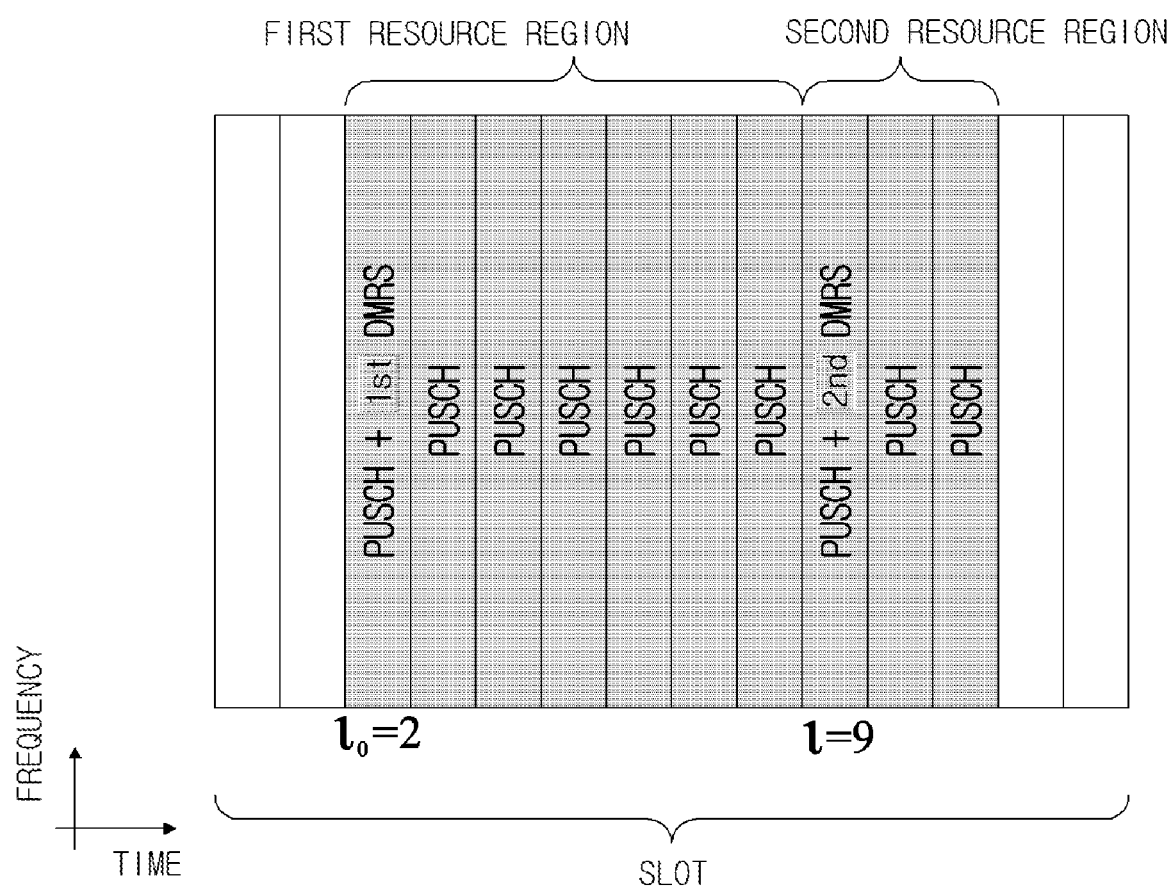

FIG. 12 is a diagram for representing an additional example of PUSCH partition transmission according to the present disclosure.

When one PUSCH is partitioned into a plurality of TRPs and transmitted in one slot, for example, one PUSCH may be mapped across 10 symbols from symbol index 2 in a slot. All resources to which a PUSCH is mapped may be divided into two resource regions (or hops). Each resource region may be configured to start at a predetermined DMRS symbol position. Accordingly, the number of symbols in each resource region may be the same or different. When a DMRS symbol position is 2 in a slot, a first resource region may start at a first DMRS symbol position and a second resource region may start at a second DMRS symbol position. For example, a PUSCH mapped to a first resource region corresponding to 7 symbols from symbol index 2 to 8 in a slot (i.e., corresponding to a first partitioned part of one PUSCH) may be transmitted to a first TRP based on a first transmission beam. A first DMRS may be mapped (i.e., multiplexed with a PUSCH) to a first symbol in a first resource region. A PUSCH mapped to a second resource region corresponding to 3 symbols from symbol index 9 to 11 in a slot (i.e., corresponding to a second partitioned part of one PUSCH) may be transmitted to a second TRP based on a second transmission beam. A second DMRS may be mapped (i.e., multiplexed with a PUSCH) to a first symbol in a second resource region.

For example, when a plurality of DMRS symbols are transmitted to a PUSCH in Table 6 (i.e., when an additional DMRS is transmitted), a start position of an additional DMRS symbol may be configured as a start occasion of resource 2. In other words, a start occasion of resource 2 may be configured based on a start position of an additional DMRS symbol. For example, when a PUSCH composed of 10 symbols is configured as mapping type A, dmrs-AdditionalPosition=pos1, a DMRS symbol position may be determined as $l_0$ and 9 according to Table 6. In this case, among all PUSCH resources, resource 1 ends in symbol 8 and resource 2 starts in symbol 9, so UE and a base station may make a determination through signaling exchange or by a predetermined rule. If there are 2 additional DMRS symbols (i.e., when there are 3 DMRS symbols in a slot), a first or second additional DMRS symbol (i.e., a second or third DMRS symbol in a slot) may become a start symbol position of resource 2. In addition, if there are 3 additional DMRS symbols (i.e., when there are 4 DMRS symbols in a slot), a first or second additional DMRS symbol (i.e., a third or fourth DMRS symbol in a slot) may become a start symbol position of resource 2.

Here, Table 6 is an example of a case in which frequency hopping is not applied, but in embodiment 2-3, a DMRS position in a slot may be determined by Table 6 and a transmission beam hopping method of embodiment 1 may be applied by configuring a position of each resource region so that a DMRS position will become a first symbol in a resource region.

Embodiment 3

This embodiment includes a method of signaling information related to PUSCH partition transmission for MTRPs to a terminal.

Whether a terminal will transmit one PUSCH to a single TRP (STRP) without partition or partitively transmit one PUSCH to MTRPs (or whether of single transmission beam based transmission or multiple transmission beam based transmission for one uplink channel transmission in one slot) may be explicitly or implicitly signaled by a base station to a terminal. Implicit signaling may include a terminal determining or understanding whether a PUSCH is partitively transmitted based on other configuration information or signaling information.

For example, based on the number of transmission beam information configured for a terminal (e.g., a TCI state or spatial relation information), a terminal may also determine whether a PUSCH is partitively transmitted. Alternatively, although a plurality of transmission beam information is configured by a terminal, based on one or more of whether an additional DMRS exists/is configured, or the number of DMRS symbols, a terminal may also determine whether a PUSCH is partitively transmitted.

Here, when an additional DMRS exists, for example, a value of a dmrs-AdditionalPosition parameter may correspond to pos1, pos2 or pos3 except for pos0 in an example of Table 6 or Table 7. In other words, whether a PUSCH is partitively transmitted may be determined based on whether an additional DMRS except for a front-loaded DMRS exists within one PUSCH transmission duration.

In addition, the number of DMRS symbols may mean the number of symbols that a time domain OCC (Orthogonal Cover Code) is not applied. In other words, when a time domain OCC is applied, DMRS symbols to which a time domain OCC is applied may be assumed as one DMRS symbol set and whether a PUSCH is partitively transmitted may be determined based on the number of DMRS symbol sets of one PUSCH transmission duration sod.

Accordingly, based on one or more of whether an additional DMRS exists or the number of DMRS symbols (without a time domain OCC), a terminal may determine whether it is a PUSCH received by a STRP or a PUSCH received by MTRPs and determine mapping between a PUSCH and transmission beam information (e.g., a TCI state or spatial relation information).

For example, a case is assumed in which a base station indicates a plurality of TCI states (or TCI state sets) to a terminal for MTRP PUSCH transmission. In this case, when the number of additional DMRSs or the number of symbols (or symbol sets) that an additional DMRS is transmitted is K, based on k+1 TCI states of a plurality of TCI states (i.e., TCI state sets) indicated by a base station, a terminal may transmit a PUSCH to K+1 TRPS.

Although a base station provides a plurality of TCI states to a terminal, a terminal may transmit a PUSCH based on one of a plurality of TCI states (e.g., a first TCI state) if there is no additional DMRS or only one DMRS symbol (or symbol set).

When a base station provides a plurality of TCI states to a terminal, one additional DMRS exists and one DMRS symbol is additionally transmitted, a terminal may transmit a PUSCH based on two of a plurality of TCI states (e.g., a first TCI state and a second TCI state). A first TCI state may be applied from a first symbol that a PUSCH is transmitted to a symbol right before a symbol that an additional DMRS is positioned and a second TCI state may be applied from a symbol that an additional DMRS is positioned to a last symbol that a PUSCH is transmitted. Alternatively, a second TCI state may be applied from a first symbol that a PUSCH is transmitted to a symbol right before a symbol that an additional DMRS is positioned and a first TCI state may be applied from a symbol that an additional DMRS is positioned to a last symbol that a PUSCH is transmitted.

When a base station provides a plurality of TCI states to a terminal, two additional DMRSs exist and two DMRS symbols are additionally transmitted, a terminal may transmit a PUSCH based on three of a plurality of TCI states (e.g., a first TCI state, a second TCI state, a third TCI state). A first TCI state may be applied from a first symbol that a PUSCH is transmitted to a symbol right before a symbol that a first additional DMRS is positioned, a second TCI state may be applied from a symbol that a first additional DMRS is positioned to a symbol right before a symbol that a second additional DMRS is positioned and a third TCI state may be applied from a symbol that a second additional DMRS is positioned to a last symbol that a PUSCH is transmitted. Alternatively, a third TCI state may be applied from a first symbol that a PUSCH is transmitted to a symbol right before a symbol that a first additional DMRS is positioned, a second TCI state may be applied from a symbol that a first additional DMRS is positioned to a symbol right before a symbol that a second additional DMRS is positioned and a first TCI state may be applied from a symbol that a second additional DMRS is positioned to a last symbol that a PUSCH is transmitted.

A base station or a TRP may provide a terminal with TCI state information (or a TCI state set) which will be used by a terminal for PUSCH transmission through DCI or higher layer signaling (e.g., a MAC CE or RRC signaling).

When TCI state information is provided for a terminal through DCI, for example, a TCI state may be indicated by using a 2-bit sized field in DCI. When whether a PUSCH is partitively transmitted is determined based on one of the number of DMRSs (or the number of additional DMRSs) or a DMRS symbol (or the number of DMRS symbols), a DCI codepoint may be effectively used. For example, a first TCI state, a second TCI state and a third TCI state may be configured to a 00 codepoint and based on one or more of the number of DMRSs (or the number of additional DMRSs) or a DMRS symbol (or the number of DMRS symbols), whether only a first TCI state will be applied, whether a first TCI state and a second TCI state will be applied or whether all of a first TCI state, a second TCI state and a third TCI state will be applied may be selected. If whether a PUSCH is partitively transmitted should be determined only by the number of TCI states without using the number of DMRSs (or the number of additional DMRSs) or a DMRS symbol (or the number of DMRS symbols), a first TCI state should be configured to a 00 codepoint, a first and second TCI state should be configured to a 01 codepoint and a first, second and third TCI state should be configured to a 10 codepoint, so a DCI codepoint may be ineffectively used.

When TCI state information (or a TCI state set) is provided for a terminal through higher layer signaling, a TCI state may be dynamically determined based on one of the number of DMRSs (or the number of additional DMRSs) or a DMRS symbol (or the number of DMRS symbols). For example, in a TCI state set configured by higher layer signaling, the number of DMRSs (or the number of additional DMRSs) or a DMRS symbol (or the number of DMRS symbols) may be dynamically signaled through DCI and based on it, one or more TCI states that a terminal will apply PUSCH transmission may be dynamically determined.

A TCI state set which will be used for PUSCH transmission may be also configured in a CORESET that DCI which scheduled a PUSCH (or activated a corresponding PUSCH for a grant free (or configured grant) PUSCH) was received, without being configured in DCI.

Embodiment 4

This embodiment is about PUCCH partition transmission. A description on PUSCH partition transmission in the above-described embodiment 1 to 3 may be applied equally to PUCCH partition transmission. In other words, the above-described embodiment 1 to 3 may be applied to any uplink channel including a PUSCH or a PUCCH.

For PUCCH format 3 or PUCCH format 4, although an additional DMRS is not configured, there are always two or more DMRS symbols (i.e., DMRS symbols to which a time domain OCC is not applied). In other words, there are two or more front-loaded DMRS symbols and when an additional DMRS is configured, a total of 4 DMRS symbols are configured for one PUCCH resource.

In this case, a TCI state may be selected and used according to the number of DMRS symbols without division of a front-loaded DMRS and an additional DMRS. For example, there are M DMRS symbols, PUCCH transmission may be performed by using M TCI states and mapping between a TCI state and a PUCCH resource may be mapped based on a DMRS symbol similarly to mapping between the TCI state and a PUSCH resource.

Alternatively, with division of a front-loaded DMRS and an additional DMRS, if there is only a front-loaded DMRS, a PUCCH may be transmitted by using only a first TCI state and if there is an additional DMRS, a PUCCH may be transmitted by using a first TCI state and a second TCI state. In this case, when 4 DMRS symbols exist in one PUCCH transmission duration, a first TCI state may be applied from a first symbol of a PUCCH to a symbol right before a third DMRS symbol and a second TCI state may be applied from a third DMRS symbol to a PUCCH last symbol.

Figure 13:
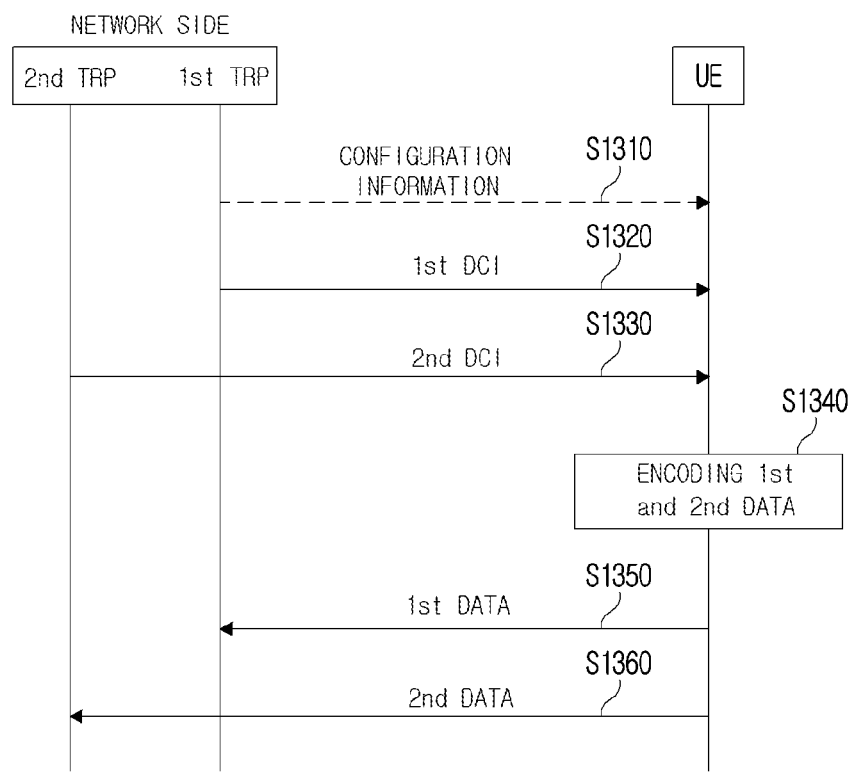
FIG. 13 is a diagram for describing a signaling procedure of a network side and a terminal according to the present disclosure.

FIG. 13 is a diagram for describing a signaling procedure of a network side and a terminal according to the present disclosure.

FIG. 13 represents signaling between a network side (e.g., a first TRP and a second TRP) and a terminal (UE) under a situation of a plurality of TRPs to which various embodiments of the present disclosure (embodiment 1, 2, 3 and/or 4) may be applied (in the following description, a TRP may be replaced with a base station, a cell or a panel, a CORE-SET). Here, an UE/Network side is just an example and may be applied by being replaced with a variety of devices as described in relation to the above-described description or FIG. 14. FIG. 13 is just for convenience of a description, and does not limit a scope of the present disclosure. In addition, some step(s) shown in FIG. 13 may be omitted according to a situation and/or a configuration, etc.

In reference to FIG. 13, signaling between 2 TRPs and UE is considered for convenience of a description, but it goes without saying that a corresponding signaling method may be extended and applied to signaling between multiple TRPs and multiple UE. In the following description, a Network side may be one base station including a plurality of TRPs and may be one cell including a plurality of TRPs. In an example, an ideal/non-ideal backhaul may be configured between a first TRP and a second TRP configuring a network side. In addition, the following description is described based on multiple TRPs, but it may be equally extended and applied to transmission through multiple panels. In addition, in the present disclosure, an operation that a terminal receives a signal from a first TRP and/or a second TRP may include an operation that a terminal receives a signal from a network side (through/with a first TRP and/or a second TRP) and an operation that a terminal transmits a signal to a first TRP and/or a second TRP may include an operation that a terminal transmits a signal to a network side (through/with a first TRP and/or a second TRP).

In S1310, UE may receive configuration information on MTRP based transmission and reception from a first TRP and/or a second TRP from a Network side.

The configuration information may include information related to a configuration of a network side (i.e., a TRP configuration), resource allocation information related to MTRP based transmission and reception, etc. In this case, the configuration information may be transmitted through higher layer signaling (e.g., RRC signaling, MAC-CE, etc.). In addition, when the configuration information is pre-defined or preconfigured to a terminal, S1310 may be omitted. For example, the configuration information may include N resource regions, N partitioned parts of one uplink channel, N transmission beams (e.g., a TCI state or spatial relation information) and a configuration related to a corresponding relationship between N TRPs, etc. described in various examples of the present disclosure.

For example, an operation that UE in S1310 (100/200 in FIG. 14) receives configuration information related to the multiple TRP-based transmission and reception from a network side (100/200 in FIG. 14) may be implemented by a device in FIG. 14 which will be described below. For example, in reference to FIG. 14, one or more processors 102 may control one or more transceivers 106 and/or one or more memories 104, etc. to receive configuration information related to the multiple TRP-based transmission and reception and one or more transceivers 106 may receive configuration information related to the multiple TRP-based transmission and reception from a network side.

UE may receive first DCI through a first TRP from a network side S1320. In addition, UE may receive second DCI through a second TRP from a network side S1330. A multiple DCI based MTRP operation may receive DCI from each TRP, respectively. Alternatively, a single DCI based MTRP operation may receive one DCI including both information of first DCI and information of second DCI from one of TRP 1 or TRP 2. In this case, the S1320 and S1330 may be merged and performed.

For example, the first DCI and the second DCI may include information on transmission beam information (e.g., a TCI state or spatial relation information) or information indicating it (e.g., QCL related information and/or transmission/reception beam information, etc.), resource allocation information on a DMRS and/or data (i.e., a space/frequency/time resource), information related to mapping of a TCI state, etc. described in various examples of the present disclosure. In an example, (indication) information on the TCI state may be configured in a form of a set. For example, the first DCI and the second DCI may include (indication) information on a plurality of TCI states. For example, the first DCI and the second DCI may include information related to frequency hopping or transmission beam hopping (e.g., link adaptation parameter/SRS related information for each hop, etc.).

DCI (e.g., first DCI and second DCI) and data (e.g., first data and second data) may be transmitted through a control channel (e.g., a PDCCH, etc.) and a data channel (e.g., a PDSCH, etc.), respectively. For example, the control channel (e.g., a PDCCH) may be repetitively transmitted and the same control channel may be partitively transmitted. In addition, S2110 and S2120 may be performed simultaneously or any one may be performed earlier than the other.

For example, the above-described operation that UE in S1320 and S1330 (100/200 of FIG. 14) receives the first DCI and/or the second DCI from a network side (100/200 of FIG. 14) may be implemented by a device in FIG. 14 which will be described below. For example, in reference to FIG. 14, one or more processors 102 may control one or more transceivers 106 and/or one or more memories 104, etc. to receive the first DCI and/or the second DCI and one or more transceivers 106 may receive the first DCI and/or the second DCI from a network side.

In S1340, UE may encode first data and second data which will be transmitted to a network side. For example, UE may perform encoding for data (e.g., first data and/or second data) based on various examples of the present disclosure.

For example, an operation that UE in S1340 (100/200 of FIG. 14) encodes the first data and second data may be implemented by a device in FIG. 14 which will be described below. For example, in reference to FIG. 14, one or more processors 102 may control one or more memories 104, etc. to perform an operation which encodes the first data and second data.

UE may transmit the first data to a network side through a first TRP S1350 and may transmit the second data to a network side through a second TRP S1360. In addition, a DMRS for the first data and/or the second data may be transmitted. The first data and/or the second data may be transmitted through a PUSCH and/or a PUCCH.

For example, a DMRS and data may be transmitted in each resource (e.g., a first resource region and a second resource region) by dividing a resource allocated to one PUSCH and/or PUCCH based on various examples of the present disclosure. For example, with transmission beam hopping, a first DMRS and second data may be transmitted in a first resource region and a second DMRS and second data may be transmitted in a second resource region. For example, when an additional DMRS is transmitted, a position of an additional DMRS may be shifted to a first symbol of a second resource region or a relative DMRS symbol position in a second resource region may be configured to be the same position as a relative DMRS symbol position in a first resource region. Alternatively, a symbol position that an additional DMRS is transmitted first may be configured as a start symbol position of a second resource region. For example, first data and second data may be transmitted and received based on a TCI state mapping method described in the above-described examples. For example, mapping of a TCI state may be configured based on the number of DMRS symbols (or the number of DMRSs, the number of additional DMRSs, the number of additional DMRS symbols, etc.). In an example, when the number of symbols of an additional DMRS is K, K+1 of a plurality of TCI states (i.e., TCI state sets) indicated by a base station may be applied to k+1 data transmission, respectively.

For example, the above-described operation that UE in S1350 and S1360 (100/200 of FIG. 14) transmits the first data and first data to a network side (200/100 of FIG. 14) may be implemented by a device in FIG. 14 which will be described below. For example, in reference to FIG. 14, one or more processors 102 may control one or more transceivers 106 and/or one or more memories 104, etc. to transmit the first data and/or second data and one or more transceivers 106 may transmit the first data and/or second data to a network side.

General Device to Which the Present Disclosure May be Applied

Figure 14:
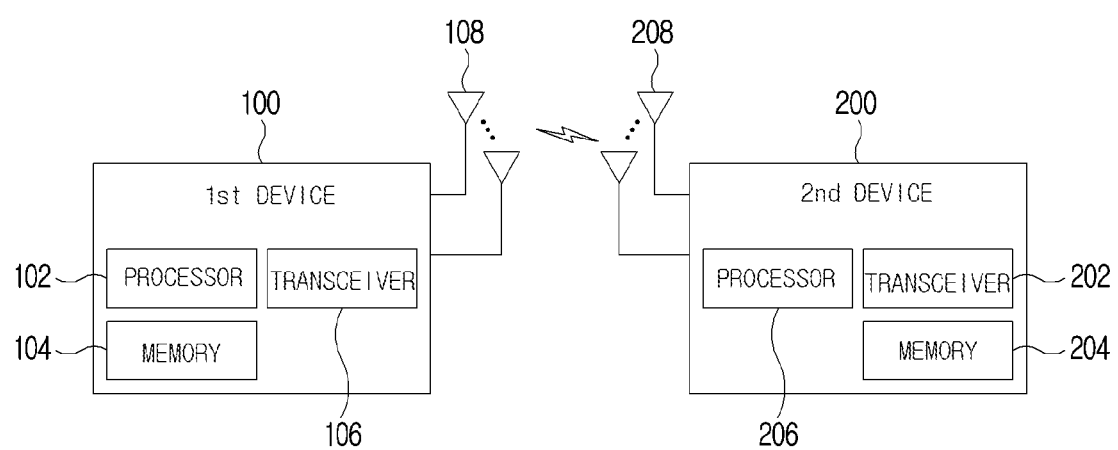
FIG. 14 illustrates a block diagram of a wireless communication system according to an embodiment of the present disclosure.

FIG. 14 is a diagram which illustrates a block diagram of a wireless communication system according to an embodiment of the present disclosure.

In reference to FIG. 14, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL APPLICABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method of transmitting an uplink channel by a terminal in a wireless communication system, the method comprising:
mapping the uplink channel to N (N is an integer equal to or greater than 2) resource regions in one slot; and
transmitting the mapped uplink channel to a network,
wherein the N resource regions include a first resource region and a second resource region,
wherein the uplink channel mapped to the first resource region is transmitted based on a first transmission beam,
wherein the uplink channel mapped to the second resource region is transmitted based on a second transmission beam,
wherein at least a start symbol includes a reference signal in each the first resource region and the second resource region.

2. The method of claim 1, wherein:
a position of the reference signal in the first resource region is based on one or more of a predetermined reference signal position or a predetermined pattern for a first hop,
the position of the reference signal in the second resource region is based on one or more of a predetermined reference signal symbol position or the predetermined pattern for a second hop.

3. The method of claim 2, wherein:
the first resource region corresponds to the first hop,
the second resource region corresponds to the second hop.

4. The method of claim 1, wherein:
a time domain position of the first resource region and the second resource region is distinguished,
a frequency domain position of the first resource region and the second resource region is a same.

5. The method of claim 1, wherein:
the first transmission beam is based on a first TCI (transmission configuration indicator) or first spatial relation information,
the second transmission beam is based on a second TCI or second spatial relation information.

6. The method of claim 1, wherein:
when a symbol position predetermined for the reference signal does not include the start symbol of each of the first resource region and the second resource region, the symbol position of the reference signal is shifted to include the start symbol.

7. The method of claim 1, wherein:
a relative position of one or more symbols that a second reference signal in the second resource region is positioned is configured to be a same as the relative position of one or more symbols that the second reference signal in the first resource region is positioned.

8. The method of claim 1, wherein:
a position of the start symbol of each of the first resource region and the second resource region is configured to be a same as at least part of a symbol position predetermined for the reference signal.

9. The method of claim 1, wherein:
when a plurality of transmission beam information is configured for the terminal,
based on a number of the reference signals or additional reference signals or the number of symbols, whether of single transmission beam based transmission or multiple transmission beam based transmission for the uplink channel is determined within the one slot.

10. The method of claim 9, wherein:
the plurality of transmission beam information is configured based on one or more of DCI (downlink control information) or higher layer signaling.

11. The method of claim 10, wherein:
information on the number of the reference signals or additional reference signals or the number of symbols is included in DCI.

12. The method of claim 1, wherein:
a corresponding relationship between a n-th (n= 1, 2, . . . , N) resource region and a n-th transmission beam is configured based on a predetermined rule or signaling between a base station and the terminal.

13. The method of claim 1, wherein:
the reference signal is an uplink demodulation reference signal (DMRS).

14. The method of claim 1, wherein:
the uplink channel is based on one transport block (TB).

15. The method of claim 1, wherein:
the uplink channel includes one or more of a PUSCH (Physical Uplink Shared Channel) or a PUCCH (Physical Uplink Control Channel).

16. A terminal of transmitting an uplink channel in a wireless communication system, the terminal comprising:
one or more transceivers; and
one or more processors connected to the one or more transceivers,
wherein the one or more processors are configured to:
map the uplink channel to N (N is an integer equal to or greater than 2) resource regions in one slot; and transmit the mapped uplink channel to a network through the transceiver, wherein the N resource regions include a first resource region and a second resource region, wherein the uplink channel mapped to the first resource region is transmitted based on a first transmission beam, wherein the uplink channel mapped to the second resource region is transmitted based on a second transmission beam, wherein at least a start symbol includes a reference signal in the first resource region and the second resource region, respectively.

17. A processing unit configured to control a terminal transmitting an uplink channel in a wireless communication system, the processing unit comprising:

one or more processors; and one or more computer memories which are operably connected to the one or more processors and store instructions performing operations based on being executed by the one or more processors, wherein the operations include:

the operation which maps the uplink channel to N (N is an integer equal to or greater than 2) resource regions in one slot; and the operation which transmits the mapped uplink channel to a network, wherein the N resource regions include a first resource region and a second resource region, wherein the uplink channel mapped to the first resource region is transmitted based on a first transmission beam, wherein the uplink channel mapped to the second resource region is transmitted based on a second transmission beam, wherein at least a start symbol includes a reference signal in the first resource region and the second resource region, respectively.

18. One or more non-transitory computer readable media storing one or more commands, wherein:

the one or more instructions control a device which transmits an uplink channel in a wireless communication system by being executed by one or more processors to:

map the uplink channel to N (N is an integer equal to or greater than 2) resource regions in one slot; and transmit the mapped uplink channel to a network, wherein the N resource regions include a first resource region and a second resource region, wherein the uplink channel mapped to the first resource region is transmitted based on a first transmission beam, wherein the uplink channel mapped to the second resource region is transmitted based on a second transmission beam, wherein at least a start symbol includes a reference signal in the first resource region and the second resource region, respectively.

* * * * *